United States Patent [19]
Connolly et al.

[11] 3,887,869
[45] June 3, 1975

[54] METHOD AND APPARATUS FOR HIGH SPEED DIGITAL CIRCUIT TESTING

[75] Inventors: John B. Connolly, Nabnasset; Yohan Cho, Carlisle, both of Mass.

[73] Assignee: Tau-tron, Inc., North Billerica, Mass.

[22] Filed: July 25, 1972

[21] Appl. No.: 275,021

Related U.S. Application Data

[63] Continuation of Ser. No. 21,657, March 27, 1970, abandoned.

[52] U.S. Cl. .......... 324/73 R
[51] Int. Cl. .......... G01r 15/12
[58] Field of Search .......... 324/73 R, 158 R, 73

[56] References Cited

UNITED STATES PATENTS

| | | | |
|---|---|---|---|
| 3,286,175 | 11/1966 | Gerbier et al. | 324/73 R |
| 3,614,608 | 10/1971 | Giedd | 324/73 R |

OTHER PUBLICATIONS

Phillon et al., "Fast Logic Function Tester;" Instr. Tech., Nov. 1967, p. 67.

Hartley; Proc. IEE, Vol. 116, No. 1, Jan. 1969, p. 22–26.

Wood; IBM Tech. Bul., Dec. 1960, pp. 18–19.

*Primary Examiner*—Alfred E. Smith
*Assistant Examiner*—Rolf Hille
*Attorney, Agent, or Firm*—Robert T. Dunn

[57] ABSTRACT

A complex digital circuit system such as a medium or a large scale integrated circuit is tested dynamically and functionally. The circuit is energized repeatedly with different sets of input signals and output signals are compared with standards. The sets of input signals successively energize the circuit at a rate of the same order of magnitude as the rate of intended operation of the circuit and the sets define a pseudo-random sequence in which each set is different. The sequence of test signals is conveniently produced by a multistage shift register having feedback loops structured and controlled to produce the particular sequence, the beginning and end of any given sequence being predetermined by a computer or operator.

4 Claims, 6 Drawing Figures

INVENTORS
JOHN B. CONNOLLY
YOHAN CHO
BY Robert T. Dunn
ATTORNEY

INVENTORS
JOHN B. CONNOLLY
YOHAN CHO

By Robert T. Dunn
ATTORNEY

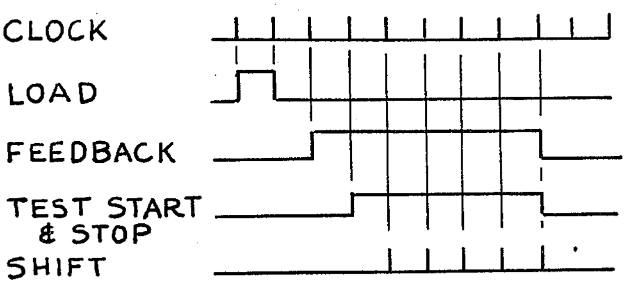
FIG 3
MAXIMUM LENGTH SEQUENCE
| CLOCK | $X_1$ | $X_2$ | $X_3$ | $X_4$ |
|---|---|---|---|---|
| 1 | 1 | 1 | 1 | 1 |
| 2 | 0 | 1 | 1 | 1 |
| 3 | 0 | 0 | 1 | 1 |
| 4 | 0 | 0 | 0 | 1 |
| 5 | 1 | 0 | 0 | 0 |
| 6 | 0 | 1 | 0 | 0 |
| 7 | 0 | 0 | 1 | 0 |
| 8 | 1 | 0 | 0 | 1 |
| 9 | 1 | 1 | 0 | 0 |
| 10 | 0 | 1 | 1 | 0 |
| 11 | 1 | 0 | 1 | 1 |
| 12 | 0 | 1 | 0 | 1 |
| 13 | 1 | 0 | 1 | 0 |
| 14 | 1 | 1 | 0 | 1 |
| 15 | 1 | 1 | 1 | 0 |
JUMP
MAXIMUM SEQUENCE COMMAND WORD
| A | B | C | D |
|---|---|---|---|
| 0 | 0 | 1 | 1 |
| **E** | **F** | **G** | **H** |
| 0 | 0 | 0 | 0 |
FIG 4
SHORT SEQUENCE
| CLOCK | $X_1$ | $X_2$ | $X_3$ | $X_4$ |
|---|---|---|---|---|
| 1 | 1 | 1 | 1 | 1 |
| 2 | 0 | 1 | 1 | 1 |
| 3 | 0 | 0 | 1 | 1 |
| 4 | 1 | 0 | 0 | 1 |
| 5 | 1 | 1 | 0 | 0 |
| 6 | 0 | 1 | 1 | 0 |
| 7 | 1 | 0 | 1 | 1 |
| 8 | 0 | 1 | 0 | 1 |
| 9 | 1 | 0 | 1 | 0 |
| 10 | 1 | 1 | 0 | 1 |
| 11 | 1 | 1 | 1 | 0 |
SHORT SEQUENCE COMMAND WORD
| A | B | C | D |
|---|---|---|---|
| 0 | 0 | 1 | 1 |
| **E** | **F** | **G** | **H** |
| 0 | 0 | 1 | 1 |
FIG 5
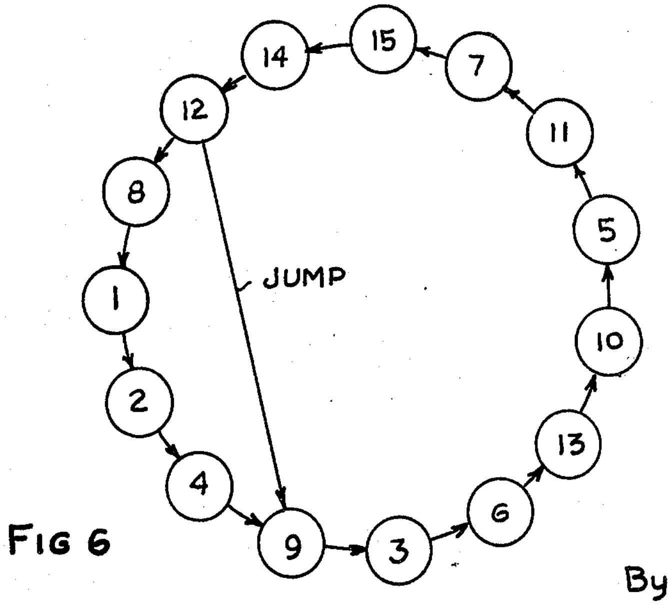
FIG 6
INVENTORS
JOHN B. CONNOLl
YOHAN CHO
By Robert T. Dunn
ATTORNEY

METHOD AND APPARATUS FOR HIGH SPEED DIGITAL CIRCUIT TESTING

This is a continuation of application Ser. No. 21,657, filed Mar. 27, 1970, now abandoned.

This invention relates to method and apparatus for testing high speed digital circuits and systems and more particularly for testing such circuits which have many input and output terminals, such as integrated circuits, sometimes referred to as MSI and LSI circuits.

Technical advances have led from the relatively simple integrated circuits having twenty or thirty components on a chip to the highly complex multi-function circuit on a chip (a larger semiconductor chip or wafer), which are referred to as MSI or LSI circuits. The MSI and LSI circuits are monolithic integrated circuits of a very complex form. The term MSI generally refers to such monolithic integrated circuits with two metalized layers for conductors on a single piece of semiconductor. The term LSI refers to monolithic integrated circuits which have more than two metalized layers and so the terms integrated circuit (or IC), MSI and LSI merely define degree of complexity. The number of different functional tests that must be made on an MSI or LSI circuit is very large. For example, an MSI circuit on a single chip consisting of v internal flip flop circuits and with $u$ inputs to the device has $2^{(u+v)}$ rows in its truth table. If (u+v is about 30, then the number of rows in the truth table can be as high as $10^9$. If the rate of test for each row in the truth table is two microseconds, then the test time is about 33 minutes to run through all of the rows of tests in the truth table. Clearly, this time for testing is excessive and limits production. Another difficulty arises in that the test performed at the rate of 2 microseconds per test is a 500KHz rate. This rate is not effective or significant as a dynamic test of circuits intended for operation at rates which are must higher, say 10 to 100MHz.

It is an object of the present invention to provide a method and apparatus for testing a complex digital circuit such as an MSI or LSI circuit which avoids the above enumerated limitations of prior test techniques.

It is another object of the present invention to provide such method and apparatus for testing complex digital circuits at a test rate which is the same order of magnitude as the intended rate of operation of the circuit.

It is another object to provide such method and apparatus which intrinsically has little or no redundancy in the number of tests.

It is a further object to provide such method and apparatus which can be readily controlled and programmed to select one or more sequences of tests which are most significant for the particular system under test.

It is another object to provide such method and apparatus by which an effective compromise can be made between the number of tests and total allowable test time for the system under test.

It is another object to provide such method and apparatus which is not limited by the speed of a computer for programming the test sequences.

The method and apparatus which is the subject of the present invention is particularly adapted for computer control with respect to the sequences of tests which are essential for the particular MSI or LSI circuit being tested. However, the computer is not fast enough to make all of the tests in each sequence without requiring an excessive amount of time. In accordance with features of the present invention, the great multitude of tests in each sequence for the circuit under test are made by a test code generator operating at a clock rate of the same order of magnitude as the intended operating rate of the circuit. The test code generator produces a unique set of test signals (a parallel digital word), which is fed to the inputs of the circuit under test each time the generator is pulsed at the clock rate and each set of tests in a sequence is different. Thus, redundancy is eliminated.

The code generator is a preloaded high speed read only memory and produces a pseudo-random code. It consists of a high speed feedback shift register which commences a test sequence from a command input and concludes the test sequence from another command input or upon arriving at a given test word. The command for each sequence selects the particular test sequence by a sequence command and starts the selected sequence at a given start test word. Thus, the command inputs may be provided by a computer which presets the shift register to the selected start test word and preloads the shift register feedback circuits to select the particular test sequence from all possible test sequences that can be produced by the shift register.

A shift register with $n$ stages can produce at its output gates as many as $2^n-1$ sets of signals before repeating a set or word and so a 20-stage register can produce a pseudorandom sequence of over a million test words without repeating. By varying the preload over a million different seqeunces can be selected and subdivided into many different groups of words. At a test interval of 10 nanoseconds, (a clock rate of 100MHz), all possible maximum length seqeunces (a thousand billion) test words could be run in 10 milliseconds. This is a far greater number of functional tests than needed for a typical MSI/LSI circuit. In practice, only a few thousand partial sequences are needed and these can be generated in a fraction of a second at the 100MHz clock rate or higher.

The output of the circuit under test is evaluated conveniently by comparing with the output of a similar standard circuit (whose performance is either ideal or acceptable) and feeding the test sequences to both circuits simultaneously. The outputs are simultaneously compared and any deviation of the test circuit from the standard circuit indicates a fault.

Other features and objects of the present invention are set forth in the following specific description, taken in conjunction with the figures in which:

FIG. 3 shows waveforms illustrating the nature of control signals for controlling the test code generator;

FIG. 4 is a table showing the maximum length random sequence of four bit test words produced by the test code generator in FIG. 2;

FIG. 5 is another table showing a commanded sequence of shorter length produced by the test code generator in FIG. 2; and FIG. 6 is a diagram to aid understanding how different sequences are selected and commanded by a program.

Figure 1:
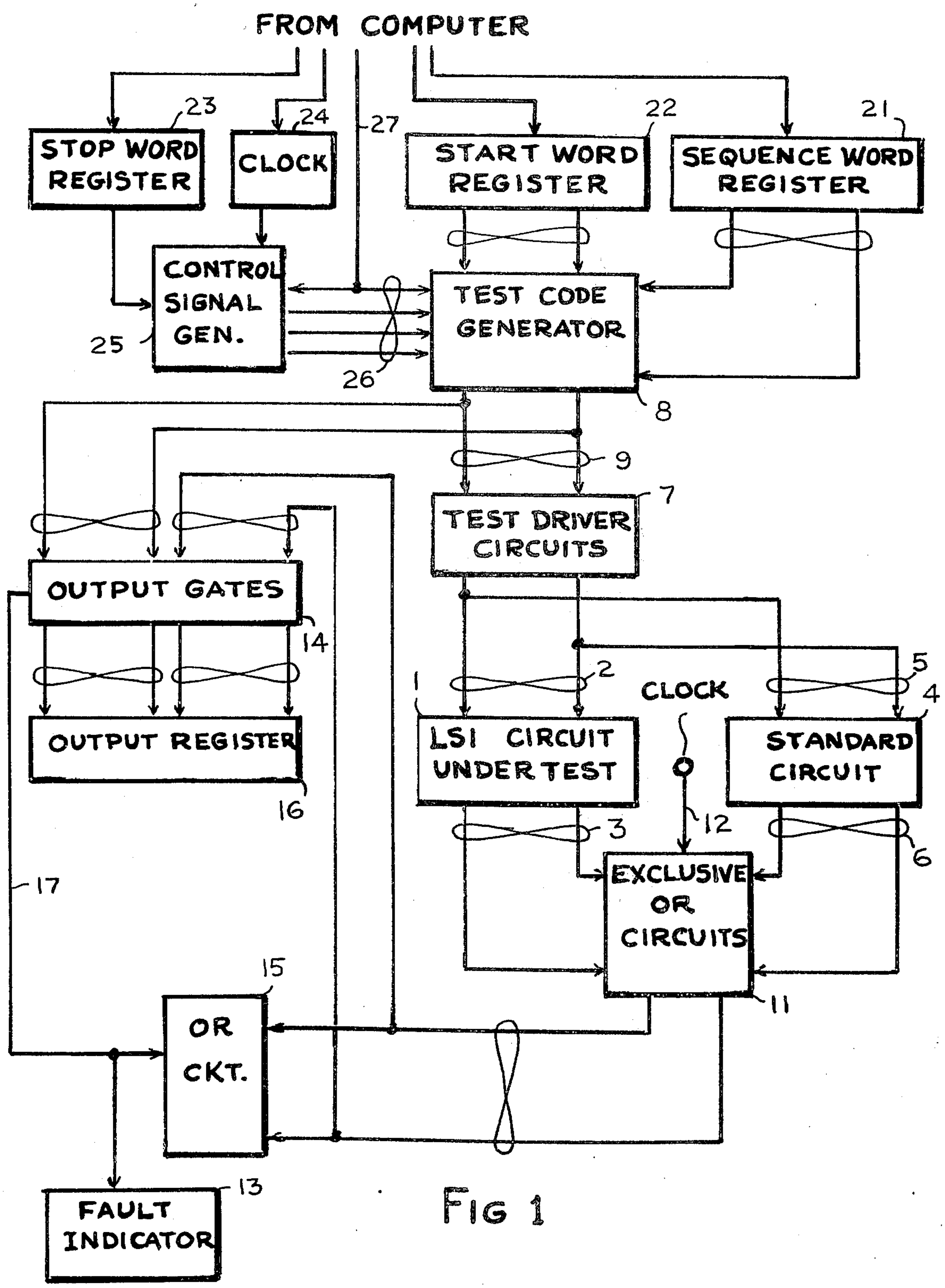
FIG. 1 is a block diagram illustrating the method and apparatus for testing a complex digital circuit or system such as an MSI or LSI system in accordance with features of the present invention.

Turning first to the block diagram in FIG. 1, there is shown a system for testing a complex digital circuit which may be an MSI or LSI integrated circuit. The circuit 1 under test has a multitude of input terminals 2 which may number twenty or more and a fewer number of output terminals 3. The circuit under test, referred to herein as the subject circuit, may be an MSI or LSI circuit system on a single chip of semiconductor such as silicon. It may consist of, for example, ten or 20 flip flop circuits and, as mentioned above, the total possible number of rows in the truth table for such a circuit may number in the millions or more.

One method of evaluating the performance of the circuit 1 is to test simultaneously a standard circuit of acceptable or ideal performance and to compare the outputs of the circuit under test and the standard circuit. For this purpose, the standard circuit 4 is provided. The inputs 5 of the standard circuit correspond with the inputs 2 of the subject circuit and the outputs 6 of the standard circuit correspond with the outputs 3 of the subject circuit. The corresponding inputs 2 and 5 of the test and standard circuits are coupled together and energized by the test driver circuits 7, which are in turn controlled by the outputs 9 from the test code generator 8. The test code generator 8 produces pseudorandom sets of parallel pulse signals (test words) at the output gates thereof and these test words are fed by the parallel output lines 9 to the test driver circuits 7, which shape, amplify, or attenuate the pulse signals which energize the input lines 2 and 5 to the subject and standard circuits.

The test code generator 8 contains a shift register, as will be described in more detail with reference to FIGS. 2 to 6 for the case of a four bit test word. The feedback loop of the shift register is controlled or preloaded from a computer, the preload being such as to select the particular test sequence that will be made and start the selected sequence of test words at a selected test word. The sequence may stop when completed or at a given test word, so that within the selected portion of a sequence there is contained certain desirable and significant test words for the subject circuit 1. The computer which contains the program for preloading the test code generator is programmmed to start and stop a number of sequences one after another to complete testing of the subject circuit 1.

The tests are made at a rate determined by a clock which triggers the test code generator. This rate is limited only by the switching rate of the shift register in the test code generator. The shift register is composed of high speed components which switch in 1 to 2 nanoseconds. These are ultra high speed UHF transistors and tunnel diodes and are described more fully herein with respect to FIG. 2. As a result, the rate at which test words are fed to the subject circuit via the drive circuits 7 is easily 100MHz. Clearly, this rate is a great deal faster than the rate that present general purpose computers could provide sets of test signals. The computer's principal function here is to store the program for preloading the shift register feedback gates and presetting the register and to initiate each sequence of test words.

The outputs 3 from the test circuit and the outputs 6 from the standard circuit are compared by a bank of exclusive OR circuits 11, which is timed by pulses from the clock via line 12. At each clock pulse, the outputs of the subject circuit 1 and standard circuit 4 are simultaneously compared and if there are any differences, the test fault indicator 13 is energized to indicate a fault in the test circuit. When the fault occurs, the output of the circuits 11 energizes output gates 14 via OR circuit 15. These gates feed the test word from the test code generator which produced the fault output and the output of the circuits 11 into an output data storage register 16.

When the tests of the subject circuit 1 are completed, the contents of the output data storage register may be read out into the computer at the end of the test cycle to analyze the test results and isolate the cause of the fault. The output register may also serve as the driver of the fault display which may be a direct print out unit.

The system in FIG. 1 is readily controlled by a computer which stores command words that designate each sequence of tests that a given subject circuit is to undergo. The commands from the computer schedule the start test word in each sequence, the last word in each sequence and the sequence itself. The maximum sequence $2^n-1$ is determined by the number of stages $n$ in the test code generator shift register and this sequence like all other shorter sequences can be started at any point and stopped before the sequence is finished or at the end of the sequence. Thus, the rate of command words from the computer can be many orders of magnitude slower than the rate of test words from the test code generator 8.

The commands are provided by the sequence word register 21, the start word register 22 and the stop word register 23. The computer also initiates the clock 24. A control signal generator 25 produces gate signals 26 which effectively time the program fed to the test code generator from the start and sequence word registers 22 and 21. The gate signals are initiated by a test start signal in line 27 from the computer and clock pulses. The word from register 23 is the total number of test words in the commanded sequence and so it determines the end of the commanded sequence.

The number of stages $n$ in the test code generator is generally determined by the number of inputs to the LSI circuit 1 under test. Thus, $n$ may be 20 or more in a typical case. The number of bits in each of the start and stop word registers 22 and 23 is $n$ and the number of bits in the sequence word register may be as high as $2n$ depending on what sequences the computer schedules. The number of outputs from the LSI circuit 1 which are monitored during the test sequences may be as large as the number of inputs and so the output register may be required to store $2n$ bits to identify each fault. Each fault is identified by the $n$ bits in the test word from test code generator 8 and as many as $n$ bits from the comparator circuits 11 (exclusive OR circuits).

For purposes of example, a four bit test code generator is described herein with reference to FIGS. 2 to 6. The operation of the test code generator in conjunction with the command words from sequence, start and stop word registers 21, 22 and 23 is described. In this case, the sequence word is eight bits, the start word is four bits and the stop word is four bits.

Figure 2:
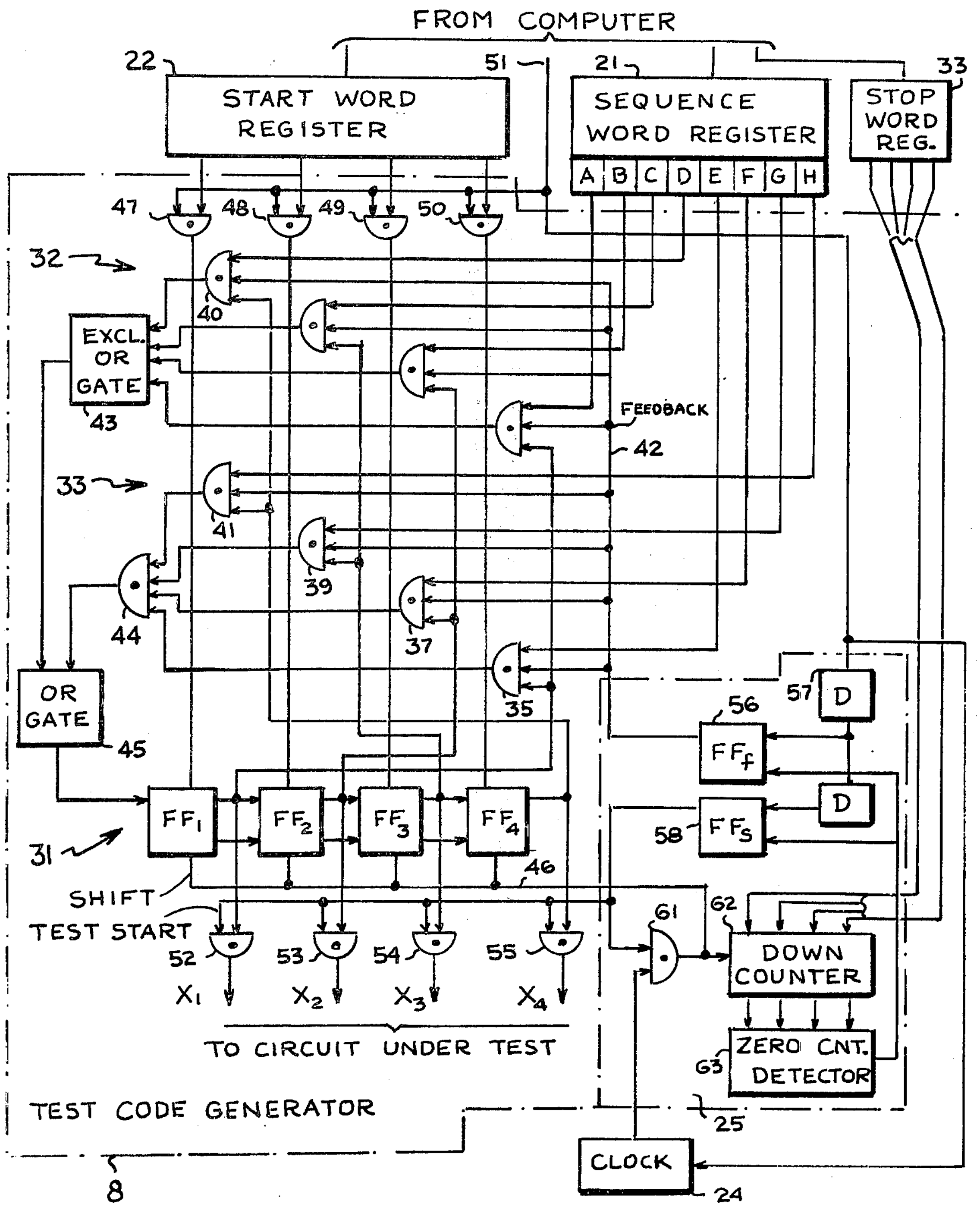
FIG. 2 is a detailed block diagram of the test code generator and control signal generator for producing commanded sequences of four bit test words as an illustration of the operation of the generator.

In FIG. 2, the command words from the computer preload the test code generator which is a programmed shift register, and orders a test sequence. The shift register shown in FIG. 2, is a maximum length type in which the feedback connections are changed in accordance with the computer program. Control words and signals from the computer vary the feedback loops in the shift register and hence vary the sequences which the shift register shifts through when pulsed by a clock and to the sequences of test words which are produced at the output of the shift register are changed. The four bit shift register can produce in a maximum length sequence 15 different test words before repeating. Varying the feedback loops, restructures the stage diagram of the shift register forcing it to have many different sequences Two different sequences are shown in FIGS. 4 and 5. FIG. 4 shows a maximum length sequence of 15 test words in the table and the sequence command word A to H which produces the maximum length sequence. The sequence in the table in FIG. 5 is shorter having eleven test words and is the same as the sequence in FIG. 4 except it skips clock numbers 4 to 7 in the maximum length sequence. The sequence word command A to H for the sequence in FIG. 5 is shown at the bottom thereof. It is 00110000.

The effect of the sequence command word A to H in the case of the maximum length sequence shown in FIG. 4 is to insert a binary 1 into $FF_1$ so that at the next clock pulse the output of $FF_1$ is a 1. This is done whenever the output of $FF_3$ or $FF_4$, but not both, is a 1. For example, in the table in FIG. 4, after the first clock pulse, the test word output is 1111 and so a 0 is inserted into $FF_1$ and at the next clock pulse the output of $FF_1$ is a 0.

In the case of the shorter sequence shown in FIG. 5, the same conditions as for the maximum length sequence apply and in addition, a one is inserted into $FF_1$ so that at the next clock pulse, the output of $FF_1$ is a 1, whenever the shift register output is 0011. by doing this, the register skips the test words for clock pulses 4 to 7 of the maximum length sequence to produce the shorter sequence shown in FIG. 5. This skip occurs when the EFGH part of the sequence word is 0011 and so the whole sequence word for the short sequence is 00110011 as shown at the bottom of FIG. 5.

The maximum length sequence for the four stage test code generator is shown also in FIG. 6 as a continuous flow of binary numbers triggered by the clock pulses. The random nature of the numbers is illustrated in FIG. 6 which shows the decimal equivalent of the four bit binary numbers represented by the test words in the sequence. The skip or jump to produce the short sequence in FIG. 5 is shown. Clearly, any of a great number of different jumps could be commanded by the sequence word from the computer.

The test code generator in FIG. 2 includes four stages each composed of one of the flip flop circuits 31, designated $FF_1$ to $FF_4$, and a pair of AND gates from the two banks 32 and 33 of AND gates. The AND gates 34 and 35 respond to the output of $FF_1$, gates 36 and 37 to respond to $FF_2$, gates 38 and 39 respond to $FF_3$ and gates 40 and 41 respond to $FF_4$. All these gates are enabled by the feedback control signal in line 42 from the control signal generator which is a timing signal.

Gates 34, 36, 38 and 40 in effect perform in conjunction with exclusive OR gate 43 to pulse the first stage $FF_1$ depending on the state of the stages $FF_1$ to $FF_4$ and the word ABCD in the sequence word register 21. The word ABCD which is the first half of the word A to H that determines the sequence identifies the maximum length sequence shown in FIG. 4. In this case, the word ABCD is 0011.

The gates 35, 37, 39 and 41 perform in conjunction with AND gate 44 to pulse the first stage $FF_1$ depending on the states of the stages $FF_1$ to $FF_4$ and the word EFGH in the sequence word register 21. For the maximum length sequence shown in FIG. 4, the word EFGH is 0000.

The exclusive OR gate 43 produces a 1 output whenever either one, but not both, of stages $FF_3$ and $FF_4$ produce a 1 output. The outputs of gates 43 and 44 are combined by OR gate 45, and applied to the input of $FF_1$. Thus, while the feedback signal in line 42 is up, the command word A to H is effective to load the shift register feedback circuits so that the register shifts through the commanded sequence when it is pulsed by shift pulses in line 46 from clock 24.

Just prior to loading the feedback circuits (gates 34 and 41), the stages $FF_1$ to $FF_4$ are preset by the command start word from register 22. This word sets the stages to produce the first test word in the commanded sequence. For this purpose, start word AND gates 47 to 50 feed the start word from register 22 to the stages $FF_1$ to $FF_4$, respectively, to preset the stages. For example, let the word in register 22 be 1111 and the word A to H in register 21 be 00110000. The load signal, shown in FIG. 3, in line 51 from the computer starts the clock 24 and opens gates 47 to 50 feeding the word 1111 into the stages $FF_1$ to $FF_4$. The word presets the stages so that the outputs from $FF_1$ to $FF_4$ fed to output AND gates 52 and 55 is the test word 1111. This same output is fed to the feedback AND gates 34 to 41 as shown. At the next clock pulse, the word A to H from sequence register 21 is fed through gates 34 to 41 when the feedback signal, shown in FIG. 3, in line 42 enables these gates. The output of exclusive OR gate 43 will be a 1 only when X3 or x4, but not both, is a 1 and upon the next clock pulse, $FF_1$ output is a 1. For the sequence word 00110000, and gate 44 never produces a 1 because the test word 0000 is never produced.

For the short sequence in FIG. 5, the sequence word is 00110011 and so AND gate 44 produces a 1 only at clock pulse number 3, and so at pulse number 4, the output of $FF_1$ is a 1 while the outputs of $FF_2$, $FF_3$ and $FF_4$ are the shifted outputs from conditions at pulse number 3.

Control signals designated clock, load, feedback, test start and stop and shift are shown in FIG. 3. These are generated by the clock 24 and control signal generator 25. Clock operation is initiated by the load pulse signal in line 51 from the computer. The load signal sends the start test word from register 22 into the shift register, starts the clock 24 and pulses feedback flip flop circuit 56 to produce the feedback signal in line 42 that enables AND gates 34 to 41. The delay 57 is twice the clock pulse interval. The load pulse also switches start flip flop circuit 58 to produce the test start and stop signal in line 59 which controls the output gates 52 to 55. The delay 60 is one clock pulse interval. The test start and stop signal controls AND gate 61 at the clock output and the output of this gate produces the shift pulses in line 46 that cause the register to shift.

The shift pulses are also fed to the preset down counter 62 which is preset by the stop word from register 23. The shift pulses cause this counter to count down until it reaches zero which is detected by the zero count detector 63. When the zero count is reached, detector 63 pulses both flip flops 56 and 58 which switch and so terminates the feedback signal and the test start and stop signal. This completes the test sequence.

Quite clearly, other techniques can be used to terminate a test sequence. Completion of the sequence could be evidenced when the shift register reaches a predetermined setting or repeats the setting that it started at or after a predetermined time interval. Then the next sequence starts with the next command from the computer. In the embodiment of the invention shown in FIG. 1, the completion of each sequence could be initiated by the next command from the computer. In that case, the commands from the computer are fed to the test code generator at predetermined intervals, which allow sufficient time for each sequence to be accomplished. Thus, if a sequence is accomplished before the termination of the interval between commands, than either redundant tests or insignificant tests are made of the subject system 1. Clearly, the number of such redundant or insignificant tests can be reduced by predetermining the intervals between commands from the computer in view of the time length of each sequence which is to be made.

The driver circuits 7 shown in FIG. 1 serve to resh: pe the pulse outputs in the parallel lines 9 from the test code generator. The driver circuit provide fast clean edges for pulses and also provide current drive capability from a matched source impedance. Due to the speed requirements of the system, the test fixtures in which the subject system 1 and standard system 4 are mounted must make use of a controlled impedance system in the exercise of microwave transmission theory. Accordingly, it is recommended that the driver circuit use a terminated system of controlled impedance transmission lines and that full consideration be made of the location and type of termination, transmission line fan in and fan out, as well as interference in matching due to the holding fixture for the subject test circuit and the standard circuit.

This completes description of methods and apparatus for applying the present invention to test high speed complex digital circuits and particularly those of the complexity of the MSI and LSI circuits. The embodiments described are the best known uses of the invention, as set forth in the accompanying claims.

What is claimed is:

1. A system for testing a complex electronic circuit where the same set of input signals are simultaneously applied to a test circuit and a standard circuit and output signals from the test and standard circuits are simultaneously compared to detect a fault in the test circuit comprising, a random number generator for generating random parallel binary numbers of up to N bits each at a rate in the dynamic operating range of the test circuit, each random number being represented as a set of N generator output signals, means applying said N output signals to inputs of both the test and standard circuits which produces in response thereto, test and standard sets of M output signals, a set of M coincidence comparing circuits, each responsive to corresponding output signals from the test and standard circuits, said M comparing circuits producing a set of M fault signals, an N stage register for storing a random number, an M stage register for storing M fault output signals, means responsive to the M fault output signals for feeding the particular random number applied to the test and standard circuits, which results in at least one fault output signal from the comparing circuits, to the N stage register, and means responsive to the M fault output signals for feeding the fault output signals to the M stage register at the same time the said particular random number is fed to the N stage register, whereby said registers store information indicative of inputs and outputs of the test circuit when a fault occurs.

2. A system as in claim 1 wherein, the last mentioned means includes, an OR circuit responsive to the M fault signals, and the OR circuit controls the input to both the N and M stage registers.

3. A system as in claim 1 further including, means for generating a predetermined random sequence start number and stop number, and means in circuit with the generator, responsive to said start and stop numbers for comparing the same with the generated number, and means responsive thereto for starting and stopping the applying of generator output signals to the test circuit.

4. A system as in claim 3 wherein, the random number generator includes a feedback type shift register of at least N stages, and means are provided for producing a predetermined random sequence number for controlling the shift register feedback, whereby, said sequence number determines the random sequence produced by the generator.

* * * * *